Patented Nov. 27, 1951

2,576,464

UNITED STATES PATENT OFFICE 2,576,464

FROTH FLOTATION OF SILICEOUS IMPURITIES FROM CELLULOSE

Arthur Langmeier, Wilmington, Del., assignor to Hercules Powder Company, Wilmington, Del., a corporation of Delaware No Drawing. Application August 5, 1949, Serial No. 108,867

15 Claims. (Cl. 209—166)

1

This invention relates to a process for removing impurities from cellulosic materials and more particularly to a process for removing siliceous impurities from such cellulosic materials as chemical cotton, wood pulp, and straw pulp.

The presence of silica and silicates in raw cellulosic materials has long constituted a problem in the art. In the case of raw cotton, the presence of the siliceous impurities is usually due to the blowing of sand and dirt into the cotton boll prior to its being harvested. The weather conditions encountered prior to the harvesting of the cotton have much to do with the degree of contamination. Furthermore, cotton obtained from different sources may be more or less contaminated due to variation in the soil types in different areas. In the case of straw pulp, some of the siliceous impurities are present for reasons similar to the contamination of cotton. However, in the case of straw and other grasses, a large amount of silica is bound into the morphological structure of the fibers. In the case of wood, the silica or silicate is usually present due to contamination during lumbering and subsequent operations in which the wood is reduced to raw cellulose. Due to the source of the impurities, the amount to which they are present in the various cellulosic materials is subject to extreme variation.

At the present time several different methods are used in an attempt to remove silica and silicates from cellulosic materials. While these methods have met with some success, they are not entirely satisfactory, since they are incapable of removing substantially all of the siliceous impurities from cellulosic materials. Most methods take advantage of the relatively greater density of the silica or silicate and attempt to remove the impurities by causing them to settle out of the cellulosic pulp at various stages of the refining process. Probably the most effective and best known means of removing silica and silicates from cellulosic pulps is the riffle trough. However, it has been found that the residual siliceous impurities often cause considerable difficulty when the cellulose pulp is converted to cellulose derivatives. For example, the presence of minute amounts of silica and insoluble silicates in viscose solutions has been found to constitute a marked hindrance to the filtration and spinning of such solutions. It is also believed that the presence of silica and silicates in many currently used cellulose acetate molding powders is at least partially responsible for much of the haze showing up in molded articles or transparent sheets formed therefrom. Consequently, it is highly desirable to remove as much as possible of the siliceous impurities present in cellulosic materials in the course of processing the material for end product use.

The principal object of the present invention is a process by which substantially all of the silica and silicates present in cellulosic materials can be removed in a facile and economical manner.

Other objects of the invention will appear hereinafter as set forth in the specification and appended claims.

Generally described, the present invention resides in the discovery that surprisingly improved results are obtained in the purification of a cellulosic material containing siliceous impurities by forming a dilute aqueous slurrry of the cellulosic material, dispersing in the slurry a cationic surface-active material and a surface tension depressant for the water, agitating and aerating the system thus formed, continuously removing the froth formed on the surface of the system during agitation and aeration, and separating the purified cellulosic material from the system. In this process, the siliceous impurities are effectively separated from the cellulose fibers and are removed with the froth.

The cationic surface-active materials which are operable in this invention include such flotation agents for the siliceous impurities as amines and salts thereof derived from fatty or resin acids and the quaternary salts of these amines. The surface tension depressants which are operable in the invention include such materials as pine oil, cresylic acid, aliphatic alcohols and hydroperoxides.

Having generally described the invention, the following examples are given for the purpose of more specific illustration.

TABLE I

In Examples 1-6 below, a 280-g. (dry weight) sample of viscose-type sheeted chemical cotton was slurried in a large rubber-lined vessel provided with means for agitating and aerating the contents. The slurry was diluted to about 1% solids with water having a pH of 7.7-8.3 and .195 g. of pine oil was added along with the cationic surface-active agent listed below. In each case the diluted slurry was agitated and aerated for 5 minutes. The froth produced by the agitation and aeration was continuously removed. Both the froth and the remaining portion of the slurry were dried, weighed, and analyzed with the result shown in the following table.

| Example | Cationic Surface-Active Agent Surface Tension Depressant | Amt. | | Per Cent Wt. | Per Cent HCl Insol. | Per Cent Silica (Volatile with HF) |
|---|---|---|---|---|---|---|
| | | Grams | | | | |
| 1 | Control | | Residue | 100.0 | 0.0133 | 0.0010 |
| 2 | Armac T [1] | .14 | Froth | 3.3 | 0.415 | 0.326 |
| | | | Residue | 96.7 | 0.0085 | 0.0065 |
| | | | | 100.0 | | |
| 3 | Armac 12 [2] | .14 | Froth | 3.5 | 0.372 | 0.279 |
| | | | Residue | 96.5 | 0.0039 | 0.0031 |
| | | | | 100.0 | | |
| 4 | Hydroabietylacetotrimethylammonium chloride | .2 | Froth | 3.7 | 0.405 | 0.326 |
| | | | Residue | 96.3 | 0.0074 | 0.0060 |
| | | | | 100.0 | | |
| 5 | Dodecylpyridinium chloride | .2 | Froth | 5.3 | 0.405 | 0.306 |
| | | | Residue | 94.7 | 0.0035 | 0.0021 |
| | | | | 100.0 | | |
| 6 | Dehydroabietylamine acetate | .14 | Froth | 2.7 | 0.337 | 0.258 |
| | | | Residue | 97.3 | 0.0016 | 0.0008 |
| | | | | 100.0 | | |

[1] Armac T—Tallow amine acetate, mixture 30% hexadecylamine acetate, 25% octadecylamine acetate and 45% octadecenylamine acetate.
[2] Armac 12—Dodecylamine acetate.

TABLE II

In each of Examples 7-10 below, 280 g. of viscose-type sheeted chemical cotton was slurried in a vessel similar to that employed in the preceding examples. The slurry was then diluted to about 1% solids with water having a pH of 7.7-8.3, and .14 g. of dehydroabietylamine acetate and the amount of the various surface tension depressants set forth below were added. The slurry was then agitated and aerated and the resulting froth continuously removed for a period of 5 minutes. The froth collected and the remaining portion of the slurry were then dried, weighed, and analyzed with the results shown below. Example 7 presents an analysis of the slurry prior to processing as in Examples 8, 9 and 10.

| Example | Surface Tension Depressant | Amt. | | Per Cent Wt. | Per Cent HCl Insol. | Per Cent Silica (Volatile with HF) |
|---|---|---|---|---|---|---|
| | | Grams | | | | |
| 7 | Control | | Residue | 100.0 | 0.0142 | 0.0108 |
| 8 | Cresylic acid | .195 | Froth | 3.8 | 0.385 | 0.291 |
| | | | Residue | 96.2 | 0.0052 | 0.0034 |
| | | | | 100.0 | | |
| 9 | Terposol 100 [1] | .195 | Froth | 4.4 | 0.396 | 0.239 |
| | | | Residue | 95.6 | 0.0027 | 0.0012 |
| | | | | 100.0 | | |
| 10 | Methyl amyl alcohol [2] | .195 | Froth | 6.6 | 0.347 | 0.250 |
| | | | Residue | 93.4 | 0.0039 | 0.0023 |
| | | | | 100.0 | | |

[1] Cumene hydroperoxide.
[2] Methylisobutylcarbinol.

TABLE III

In Examples 11-13 a 280-g. sample of unbleached, unsheeted wood pulp was prepared from Southern pine wood by a prehydrolysis-sulfate process and was slurried in a vessel similar to that used in the preceding examples. The slurry was diluted to about 1% solids with water having a pH of 8.0, and .14 g. of dehydroabietylamine acetate and .195 g. of the below-listed surface tension depressant were added. The slurry was then agitated and aerated and the resulting froth continuously removed for a period of 5 minutes. The froth thus collected and the remaining portion of the slurry were dried and the residues were analyzed with the results shown below. Example 11 presents an analysis of the slurry prior to processing as in Examples 12 and 13.

| Example | Surface Tension Depressant | Amt. | | Per Cent Wt. | Per Cent HCl Insol. | Per Cent Silica (Volatile with HF) |
|---|---|---|---|---|---|---|
| | | Grams | | | | |
| 11 | Control | | Residue | 100.0 | 0.1060 | 0.0080 |
| 12 | Pine oil | .195 | Froth | 2.1 | 0.210 | 0.120 |
| | | | Residue | 97.9 | 0.0128 | 0.0047 |
| | | | | 100.0 | | |
| 13 | Cresylic acid | .195 | Froth | 3.5 | 0.110 | 0.070 |
| | | | Residue | 96.5 | 0.0065 | 0.0018 |
| | | | | 100.0 | | |

Example 14

Two hundred eighty grams of sheeted pulp prepared from wheat straw by a prehydrolysis-sulfate process was slurried in a vessel of the type employed in the preceding examples. The slurry was diluted to 1% solids with water having a pH of 8, and .195 g. of pine oil and .14 g. of dehydroabietylamine acetate were added. The slurry was then subjected to agitation and aeration and the froth thus formed was continuously collected for a period of 5 minutes. The remaining portion of the slurry was dried and the residue was analyzed as shown below. An identical analysis was made on an untreated portion of the wheat straw pulp for purposes of comparison.

| Fraction | Per Cent HCl Insol. | Per Cent Silica (Volatile with HF) |
|---|---|---|
| Control | 0.030 | 0.029 |
| Residue | 0.019 | 0.008 |

Example 15

Twenty-three 280-g. samples of viscose-type, sheeted chemical cotton were individually slurried in a rubber-lined vessel as employed in the preceding examples. Each separate slurry was diluted to approximately 1% solids with water having a pH of 8.2, and .195 g. of pine oil and .14 g. dehydroabietylamine acetate were added to each. In each test the froth resulting from agitation and aeration for 5 minutes was removed. All of the remaining portions of the slurries were dried, combined, and analyzed, and filterability tests were made of viscose solutions prepared from the combined residues. Identical tests were made on an untreated portion of chemical cotton. The following results were obtained.

| Fraction | Per Cent HCl Insol. | Per Cent Silica (Volatile with HF) | Viscose Filterability, grams/in.² |
|---|---|---|---|
| Control | 0.0092 | 0.0072 | 2,410 |
| Combined Residues | 0.0016 | 0.0003 | 3,560 |

From the foregoing examples, it is seen that this invention provides a process for the effective and economical removal of substantially all of the silica and silicates which are present in various cellulosic raw materials. The results of the greatly decreased amount of impurities in the raw cellulose are readily apparent with reference to Example 15, where the filterability of the viscose solutions made from cellulose treated in accordance with this invention actually showed an increase of 1150 grams/sq. in. over the untreated cellulose.

It is evident that there are numerous factors which will influence conditions for the most satisfactory operation of the invention, the actual limits of which cannot be established except by a detailed study of each set of raw materials and the finished products involved.

Although sheeted cellulose was employed in the examples illustrated in the process of this invention, it is to be understood that the invention is not confined to sheeted cellulose or even to treatment following digestion but may be suitably applied as desired, at any place in the purification schedule. Furthermore, it is not necessary that the various reagents employed in the process of the invention be used alone as illustrated. It is within the scope of this invention that the reagents be used in mixtures with each other as desired.

The preferred cationic surface-active agent, dehydroabietylamine acetate, may be prepared prior to use by treating dehydroabietylamine with a dilute solution of acetic acid. The dehydroabietylamine may be prepared by reacting ammonia with dehydroabietic acid to form the nitrile from the carboxyl group of the acid and then by hydrogenating the nitrile thus formed to form the amine. The reactions involved in the preparation of dehydroabietylamines may be generally illustrated as follows:

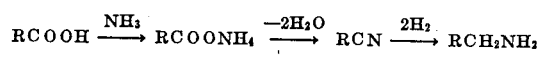

$$RCOOH \xrightarrow{NH_3} RCOONH_4 \xrightarrow{-2H_2O} RCN \xrightarrow{2H_2} RCH_2NH_2$$

Of the surface tension depressants disclosed, pine oil and cumene hydroperoxide are preferred. The cumene hydroperoxide is preferably prepared by the liquid phase oxidation of cumene. An oxygen-carrying gas is passed through the cumene at a temperature between about 25° C. and about 95° C. in the presence of an aqueous alkali. The concentration of the aqueous alkali may be between about 1% and about 35% and preferably between about 2% and about 8%. Vigorous agitation is desirable during the oxidation reaction. Many other surface tension depressants which are operable, other than those specifically disclosed, are known to the art.

In the practical application of the invention the water slurry should have a pH of between 4 and 10 and preferably between 7 and 9 and the solids content of the slurry should be adjusted between 0.1 and 4.0%. The cationic surface-active flotation agent should be dispersed in the slurry in an amount between 0.05 and 8.0 pounds per ton of cellulosic material being treated. The surface tension depressant for the water should be dispersed in the slurry in an amount between 0.05 and 10 pounds per ton of cellulosic material.

It will be seen, therefore, that this invention may be carried out by the use of various modifi-

What I claim and desire to protect by Letters Patent is:

1. In the purification of a cellulosic material containing siliceous impurities, the process which in combination comprises forming a dilute aqueous slurry of the cellulosic material, dispersing in the slurry a cationic surface-active flotation agent for the siliceous impurities and a surface tension depressant for the water, agitating and aerating the system thus formed, continuously removing froth formed on the surface of the system during agitation and aeration, and separating purified cellulosic material from the system.

2. In the purification of a cellulosic material containing siliceous impurities, the process which in combination comprises forming a dilute aqueous slurry of the cellulosic material, dispersing in the slurry a salt of a resin acid amine and a surface tension depressant for water, agitating and aerating the system thus formed, continuously removing the froth formed on the surface of the system during agitation and aeration, and separating the purified cellulosic material from the system.

3. In the purification of a cellulosic material containing siliceous impurities, the process which in combination comprises forming a dilute aqueous slurry of the cellulosic material, dispersing in the slurry a salt of a fatty acid amine and a surface tension depressant for water, agitating and aerating the system thus formed, continuously removing the froth formed on the surface of the system during agitation and aeration, and separating the purified cellulosic material from the system.

4. In the purification of a cellulosic material containing siliceous impurities the process which in combination comprises forming a dilute aqueous slurry of the cellulosic material, dispersing in the slurrry a quaternary salt of a resin acid and a surface tension depressant for water, agitating and aerating the system thus formed, continuously removing the froth formed on the surface of the system during agitation and aeration, and separating the purified cellulosic material from the system.

5. In the purification of a cellulosic material containing siliceous impurities, the process which in combination comprises forming a dilute aqueous slurry of the cellulosic material with water having a pH of between 4.0 and 10.0, said slurry being adjusted to 0.1 to 4.0% solids, dispersing in the slurry between 0.05 and 8.0 pounds per ton of cellulosic material of a cationic surface-active flotation agent for the siliceous impurity, and between 0.05 and 10.0 pounds per ton of cellulosic material of a surface tension depressant for water, agitating and aerating the system thus formed, continuously removing the froth formed on the surface of the system during agitation and aeration, and separating the purified cellulosic material from the system.

6. In the purification of a cellulosic material containing siliceous impurities, the process which in combination comprises forming a dilute aqueous slurry of the cellulosic material with water having a pH of between 4.0 and 10.0, said slurry being adjusted to 0.1 to 4.0% solids, dispersing in the slurry between 0.05 and 8.0 pounds per ton of cellulosic material of a salt of a resin acid amine, and between 0.05 and 10.0 pounds per ton of cellulosic material of a surface tension depressant for water, agitating and aerating the system thus formed, continuously removing the froth formed on the surface of the system during agitation and aeration, and separating the purified cellulosic material from the system.

7. In the purification of a cellulosic material containing siliceous impurities, the process which in combination comprises forming a dilute aqueous slurry of the cellulosic material with water having a pH of between 4.0 and 10.0, said slurry being adjusted to 0.1 to 4.0% solids, dispersing in the slurry between 0.05 and 8.0 pounds per ton of cellulosic material of dehydroabietylamine acetate and between 0.05 and 10.0 pounds per ton of cellulosic material of pine oil, agitating and aerating the system thus formed, continuously removing the froth formed on the surface of the system during agitation and aeration, and separating the purified cellulosic material from the system.

8. In the purification of a cellulosic material containing siliceous impurities, the process which in combination comprises forming a dilute aqueous slurry of the cellulosic material with water having a pH of between 4.0 and 10.0, said slurry being adjusted to 0.1 to 4.0% solids, dispersing in the slurry between 0.05 and 8.0 pounds per ton of cellulosic material of dehydroabietylamine acetate and between 0.05 and 10.0 pounds per ton of cellulosic material of cumene hydroperoxide, agitating and aerating the system thus formed, continuously removing the froth formed on the surface of the system during agitation and aeration, and separating the purified cellulosic material from the system.

9. In the purification of a cellulosic material containing siliceous impurities, the process which in combination comprises forming a dilute aqueous slurry of the cellulosic material with water having a pH of between 4.0 and 10.0, said slurry being adjusted to 0.1 to 4.0% solids, dispersing in the slurrry between 0.05 and 8.0 pounds per ton of cellulosic material of a salt of a fatty acid amine, and between 0.05 and 10.0 pounds per ton of cellulosic material of a surface tension depressant for water, agitating and aerating the system thus formed, continuously removing the froth formed on the surface of the system during agitation and aeration, and separating the purified cellulosic material from the system.

10. In the purification of a cellulosic material containing siliceous impurities, the process which in combination comprises forming a dilute aqueous slurry of the cellulose material with water having a pH of between 4.0 and 10.0, said slurry being adjusted to 0.1 to 4.0% solids, dispersing in the slurry between 0.05 and 8.0 pounds per ton of cellulosic material of dodecylamine acetate and between 0.05 and 10.0 pounds per ton of cellulosic material of pine oil, agitating and aerating the system thus formed, continuously removing the froth formed on the surface of the system during agitation and aeration, and separating the purified cellulosic material from the system.

11. In the purification of a cellulosic material containing siliceous impurities, the process which in combination comprises forming a dilute aqueous slurry of the cellulosic material with water having a pH of between 4.0 and 10.0, said slurry being adjusted to 0.1 to 4.0% solids, dispersing in the slurry between 0.05 and 8.0 pounds per ton of cellulosic material of dodecylamine acetate and between 0.05 and 10.0 pounds per ton of cellulosic material of cumene hydroperoxide, agitating and aerating the system thus formed, continuously removing the froth formed on the surface of the system during the agitation and aeration, and separating the purified cellulosic material from the system.

12. In the purification of a cellulosic material containing siliceous impurities, the process which in combination comprises forming a dilute aqueous slurry of the cellulosic material with water having a pH of between 4.0 and 10.0, said slurry being adjusted to 0.1 to 4.0% solids, dispersing in the slurry between 0.05 and 8.0 pounds per ton of cellulosic material of a quaternary salt of a resin acid and between 0.05 and 10.0 pounds per ton of cellulosic material of a surface tension depressant for water, agitating and aerating the system thus formed, continuously removing the froth formed on the surface of the system during agitation and aeration, and separating the purified cellulosic material from the system.

13. In the purification of a cellulosic material containing siliceous impurities, the process which in combination comprises forming a dilute aqueous slurry of the cellulosic material with water having a pH between 4.0 and 10.0, said slurry being adjusted to 0.1 to 4.0% solids, dispersing in the slurry between 0.05 and 8.0 pounds per ton of cellulosic material of hydroabietylacetotrimethylammonium chloride and between 0.05 and 10.0 pounds per ton of cellulosic material of pine oil, agitating and aerating the system thus formed, continuously removing the froth formed on the surface of the system during agitation and aeration, and separating the purified cellulosic material from the system.

14. In the purification of a cellulosic material containing siliceous impurities, the process which in combination comprises forming a dilute aqueous slurry of the cellulosic material with water having a pH of between 4.0 and 10.0, said slurry being adjusted to 0.1 to 4.0% solids, dispersing in the slurry between 0.05 and 8.0 pounds per ton of cellulosic material of hydroabietylacetotrimethylammonium chloride and between 0.05 and 10.0 pounds per ton of cellulosic material of cumene hydroperoxide, agitating and aerating the system thus formed, continuously removing the froth formed on the surface of the system during agitation and aeration, and separating the purified cellulosic material from the system.

15. The method for removing siliceous impurities from a cellulosic material containing same which comprises agitating and aerating a dilute aqueous slurry of said cellulosic material, said slurry containing a cationic surface-active flotation agent for said siliceous impurities and a surface tension depressant for water, and removing froth formed during said agitation and aeration.

ARTHUR LANGMEIER.

REFERENCES CITED

The following references are of record in the file of this patent:

UNITED STATES PATENTS

| Number | Name | Date |
| --- | --- | --- |
| 1,911,030 | Miles | May 23, 1933 |
| 1,982,129 | Wells | Nov. 27, 1934 |
| 2,132,902 | Lenher | Oct. 11, 1938 |